United States Patent Office 3,424,307
Patented Jan. 28, 1969

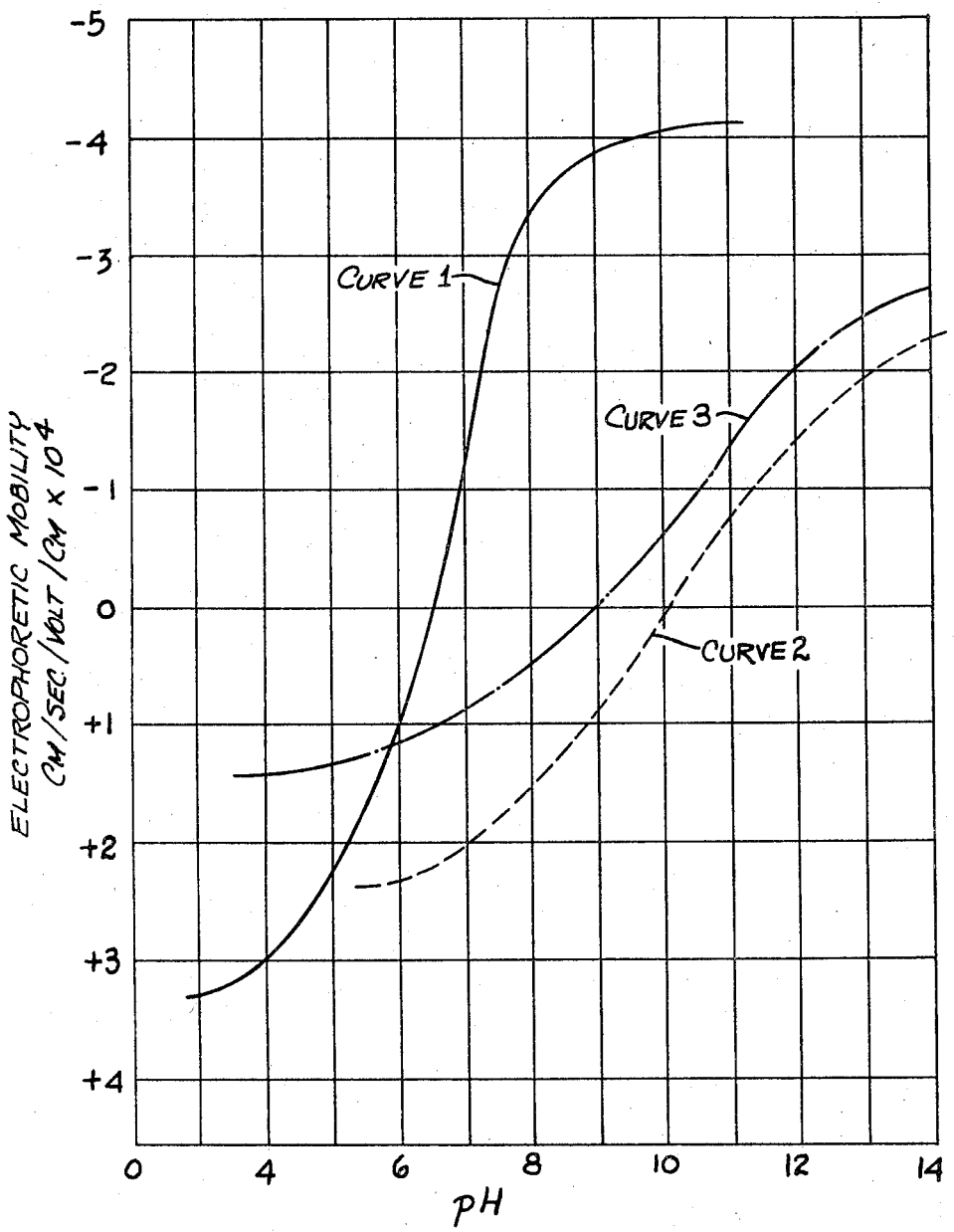

3,424,307
METHOD FOR SEPARATING ASBESTOS FIBERS FROM FOREIGN SOLIDS
Chung Hsiung Shiuh, Neshanic, N.J., assignor to Johns-Manville Corporation, New York, N.Y., a corporation of New York
Filed Dec. 30, 1965, Ser. No. 517,707
U.S. Cl. 209—2      5 Claims
Int. Cl. B01k 1/00; B03c 1/00

ABSTRACT OF THE DISCLOSURE

Magnetite is separated from asbestos fibers by adjusting the pH of an asbestos fiber water slurry to a level at which both asbestos fibers and magnetite have the same electrophoretic mobility characteristic and subsequently, separating the magnetite by means of magnetic or gravity separation.

---

This invention relates to the cleaning of asbestos fibers and particularly to a system where the asbestos fibers to be cleaned are incorporated into a water slurry prior to passage through a cleaning system. While directed generally to the cleaning of asbestos fibers and any foreign material, the invention is particularly directed to the separation of magnetite from chrysotile asbestos fibers while these materials are in a water slurry.

The conventional manner of extracting magnetite from chrysotile asbestos fibers is to form a water slurry containing magnetite and chrysotile asbestos fibers and to pass this water slurry through a magnetic or a gravitational separator. Experience has shown that in either of these systems difficulty is encountered in separating the fine magnetite particles from the chrysotile asbestos fibers.

The primary object of the instant invention is to provide a system for the separation and removal of magnetite from asbestos fibers.

The foregoing object is accomplished in the preferred embodiment of the invention by forming a water slurry of the asbestos fibers having undesired quantities of magnetite associated therewith. After the water slurry containing the asbestos fibers and the magnetite has been formed, the pH of the slurry is adjusted by the addition of either an acid or a base salt. When the pH of the slurry has been adjusted an amount so that the asbestos fibers and the magnetite particles have the same electrophoretic mobility characteristic, wherein such characteristic is used to signify either the positive or negative nature of the electrophoretic mobility, there is a tendency for the asbestos fibers and the magnetite particles to repel each other. The slurry with the adjusted pH value is then passed through a magnetic or a gravitational separator in which the magnetite particles are separated from the asbestos fibers.

The invention will be more fully understood and further objects and advantages thereof will become apparent when reference is made to the following detailed description of a preferred embodiment of the invention and the accompanying drawing.

Referring to the drawing, there is shown a graph illustrating the electrophoretic mobility of various substances in relation to the pH value of a water slurry in which each substance is contained. Curve 1 illustrates the electrophoretic mobility of magnetite which varies from about a charge of about +3.3 at a pH of 3 through a zero potential at a pH of about 6.5 to a charge of about −4 at a pH of about 12. Curve 2 illustrates the electrophoretic mobility of chrysotile asbestos fibers of the type produced at the Jeffry mine of Johns-Manville Corporation is located at Asbestos, Canada and shows these chrysotile asbestos fibers when in a water slurry to vary from a charge of about +2.4 at a pH of 5 through a zero potential at a pH of about 10 to a charge of −1.3 at a pH of about 12. Curve 3 illustrates the electrophoretic mobility of chrysotile asbestos fibers of the type produced at the Coalinga mine of Johns-Manville Corporation located at Coalinga, Calif., and shows these chrysotile asbestos fibers when in a water slurry to vary from a charge about +1.3 at a pH of 4 through a zero potential at a pH of about 9 to a charge of about −2.0 at a pH of 12.

One method of cleaning unwanted particles from asbestos fibers involves the preparation of a water slurry containing the asbestos fibers and the unwanted particles. In those instances wherein the unwanted particles comprise magnetite and the asbestos fibers comprise a chrysotile asbestos fiber, the water slurry is prepared and passed through a gravitational or a magnetic separator. Experience has shown that in either the gravitational or magnetic separator difficulty is encountered in separating the fine magnetite from the asbestos fibers. A conventional water slurry containing chrysotile asbestos fibers and magnetite will have a pH of about 8.0. The graph in the drawing illustrates that at this pH reading the electrophoretic mobility of the magnetite is negative while the electrophoretic mobility of the chrysotile asbestos fiber is positive. Thus, there is a tendency for the magnetite to be attracted to the asbestos fibers. While this tendency can be broken by the action of the gravtitional or the magnetic separator on the relationship between the coarse magnetite and the asbestos fibers, the fine magnetite particles tend to cling to the asbestos fibers and resist separation. However, if the pH of the slurry is adjusted to be acidic, such as by the addition of a hydrochloric acid to the water slurry so that the pH drops below 6.5, then the electrophoretic mobility of the magnetite and the electrophoretic mobility of the chrysotile asbestos fibers are both positive. Since like charges repel, there is a tendency for the fine magnetite particles to be moved away from the asbestos fibers so as to enhance the cleaning operation. This same effect may be produced by making the water slurry more basic by the addition of a base salt such as sodium hydroxide to the water slurry. As illustrated in the graph, the electrophoretic mobility of the magnetite becomes negative above a pH reading of about 6.5 while the electrophoretic mobility of Coalinga chrysotile asbestos fiber becomes negative at a pH reading of about 9.0 and the electrophoretic mobility of Jeffry chrysotile asbestos fibers becomes negative at a pH reading of about 10.0. Therefore, at a pH reading of 9.0 and higher, the Coalinga chrysotile asbestos fibers and the magnetite have the same electrophoretic mobility characteristic and tend to repel each other, and at a pH reading of 10.0 and higher, the Jeffry chrysotile asbestos fibers and the magnetite have the same electrophoretic mobility characteristic and tend to repel each other. It is evident that if a water slurry is adjusted to be either definitely acidic or basic, the magnetite and chrysotile asbestos fibers will have the same electrophoretic mobility characteristic and tend to repel each other.

When a water slurry containing chrysotile asbestos fibers and magnetite has been adjusted in accordance with the procedures set forth above to be definitely acidic or basic and then passed through a magnetic or a gravitational separator, more of the fine magnetite particles will be separated from the asbestos fibers. The following Chart A illustrates a series of tests showing the different amounts of magnetite separated from chrysotile asbestos fibers of the type produced from asbestos fibers mined at the Jeffry mine and identified by Johns-Manville Corporation under the trade designation 7T5. In each test, 35 grams of asbestos fibers of the original lot of asbestos fibers was added to 2000 cc. of water. In Test No. 1, an amount of hydrochloric acid sufficient to change the pH to about 3.5 was added to the water slurry while in Test No. 4, an amount of sodium hydroxide sufficient to change the pH to about 11.5 was added to the water slurry. The water slurry in each test was then passed through a magnetic separator and the amount of magnetite remaining in the asbestos fibers was measured. This chart clearly shows that more magnetite is removed from the asbestos fibers when the pH of the water slurry is definitely acidic or basic in an amount so that the magnetite and chrysotile asbestos fibers have the same electrophoretic mobility characteristic.

CHART A

| Test No. | Fiber | pH | Percent of magnetite remaining in fiber | Percent of magnetite removed |
|---|---|---|---|---|
| Original | 7T5 | | 3.5 | 0 |
| 1 | | 3.5 | 0.55 | 84.5 |
| 2 | | 9.5 | 1.05 | 70.0 |
| 3 | | 9.6 | 1.05 | 70.0 |
| 4 | | 11.5 | 0.55 | 84.5 |

The following Chart B illustrates a series of tests showing the different amounts of magnetite separated from chrysotile asbestos fibers from the Coalinga mine and identified by Johns-Manville under the trade designation Blue Brand. In each test 25 lbs. of asbestos fibers of the original lot of asbestos fibers was added to 2000 liters of water. In Test Nos. 2, 3, and 4, an amount of sodium hydroxide sufficient to change the pH reading in each of these tests to 10.1, 10.8, and 11.0, respectively, was added to the water slurry. The water slurry in each test was then passed through a gravity separator and the amount of magnetite remaining in the asbestos fibers was measured. The results in Chart B clearly show that more magnetite is separated from the chrysotile asbestos fibers when the pH has been adjusted to a more definitely basic condition where the electrophoretic mobility characteristics of the magnetite and the chrysotile asbestos fibers are the same.

CHART B

| Test No. | pH | Percent of magnetite remaining in fiber | Percent of magnetite removed |
|---|---|---|---|
| Original | | 2.00 | 0.00 |
| 1 | 8.5 | 0.20 | 90.0 |
| 2 | 10.1 | 0.14 | 93.0 |
| 3 | 10.8 | 0.14 | 93.0 |
| 4 | 11.0 | 0.15 | 92.5 |

It is noted that the amount of asbestos fibers used in each test in Chart B was much greater than the asbestos fibers used in each test in Chart A. This is true since the tests for Chart A were run on small scale laboratory equipment, while the tests for Chart B were run on production equipment. Also, the tests in Chart B are all on the basic side of the pH reading since the equipment used in this series of tests is subject to acidic attack. It is further noted that more magnetite is separated from asbestos fibers when a gravity separator is used. However, the action of the gravity separator on the asbestos fibers is more harsh than of the magnetic separator. Therefore, the type of separator employed depends upon the final desired characteristics in the asbestos fibers.

Although the foregoing examples are directed to the separation of magnetite from chrysotile asbestos fibers, it is understood that the inventive concepts of the instant application are applicable to the separation of any type of unwanted particles in a water slurry including any and all types of asbestos fibers.

While the invention has been described in rather full detail, it will be understood that these details need not be strictly adhered to and that various changes and modifications may suggest themselves to one skilled in the art, all falling within the scope of the invention as defined by the subjoined claims.

What I claim is:

1. In a system for cleaning asbestos fibers by separating unwanted particles therefrom, wherein a water slurry containing the asbestos fibers and the unwanted particles is prepared and passed through a separator, the method comprising:
   (a) preparing a water slurry containing asbestos fibers having unwanted particles intermixed therewith,
   (b) adjusting the pH of said slurry to an extent such that said asbestos fibers and said unwanted particles have the same electrophoretic mobility characteristic,
   (c) passing said slurry having the adjusted pH through a separator to separate said asbestos fibers and said unwanted particles.

2. A method as defined in claim 1 and further comprising:
   (a) preparing said water slurry with asbestos fibers having magnetite particles as said unwanted particles.

3. A method as defined in claim 2 and further comprising:
   (a) adjusting the pH of said slurry so that the slurry is definitely basic to an extent such that said asbestos fibers and said magnetic have the same electrophoretic mobility characteristic.

4. A method as defined in claim 2 further comprising:
   (a) adjusting the pH of said slurry so that the slurry is definitely acidic to an extent such that said asbestos fibers and said magnetite have the same electrophoretic mobility characteristic.

5. A method as defined in claim 1 and further comprising:
   (a) preparing said water slurry with chrysotile asbestos fibers having magnetite particles as said unwanted particles.

References Cited

UNITED STATES PATENTS 2,662,639  12/1953  Novak _____ 209—2
3,297,516  1/1967  Naumann _____ 162—3

OTHER REFERENCES

R. Dobry: Chemical Engineering Progress, vol. 54, No. 4, April 1958, p. 59.

FRANK W. LUTTER, *Primary Examiner.*

U.S. Cl. X.R.

209—3, 214; 204—180